Dec. 1, 1959 H. V. JAMIESON 2,914,999
APPARATUS FOR PROCESSING MOTION PICTURE FILM
Filed Oct. 6, 1955 4 Sheets-Sheet 2
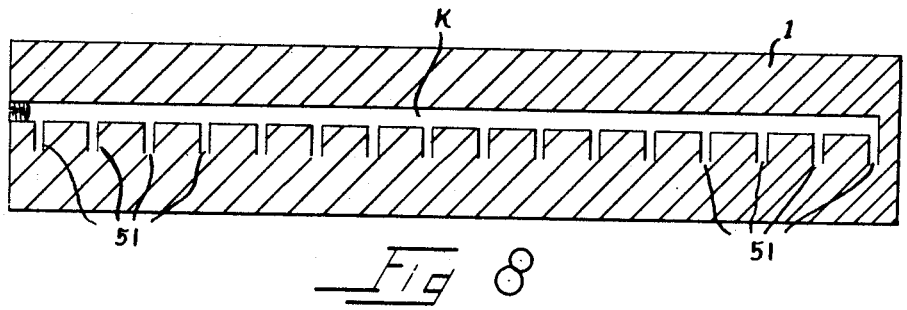
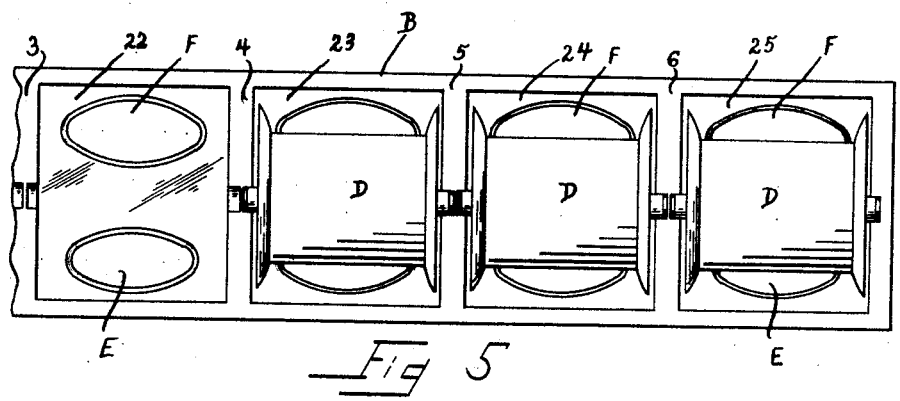
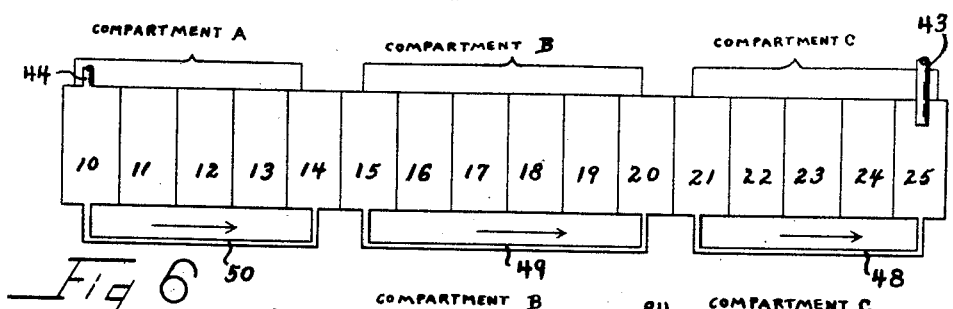
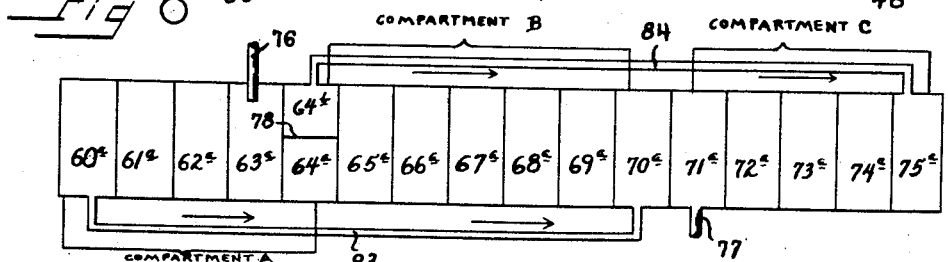
INVENTOR.
HUGH V. JAMIESON

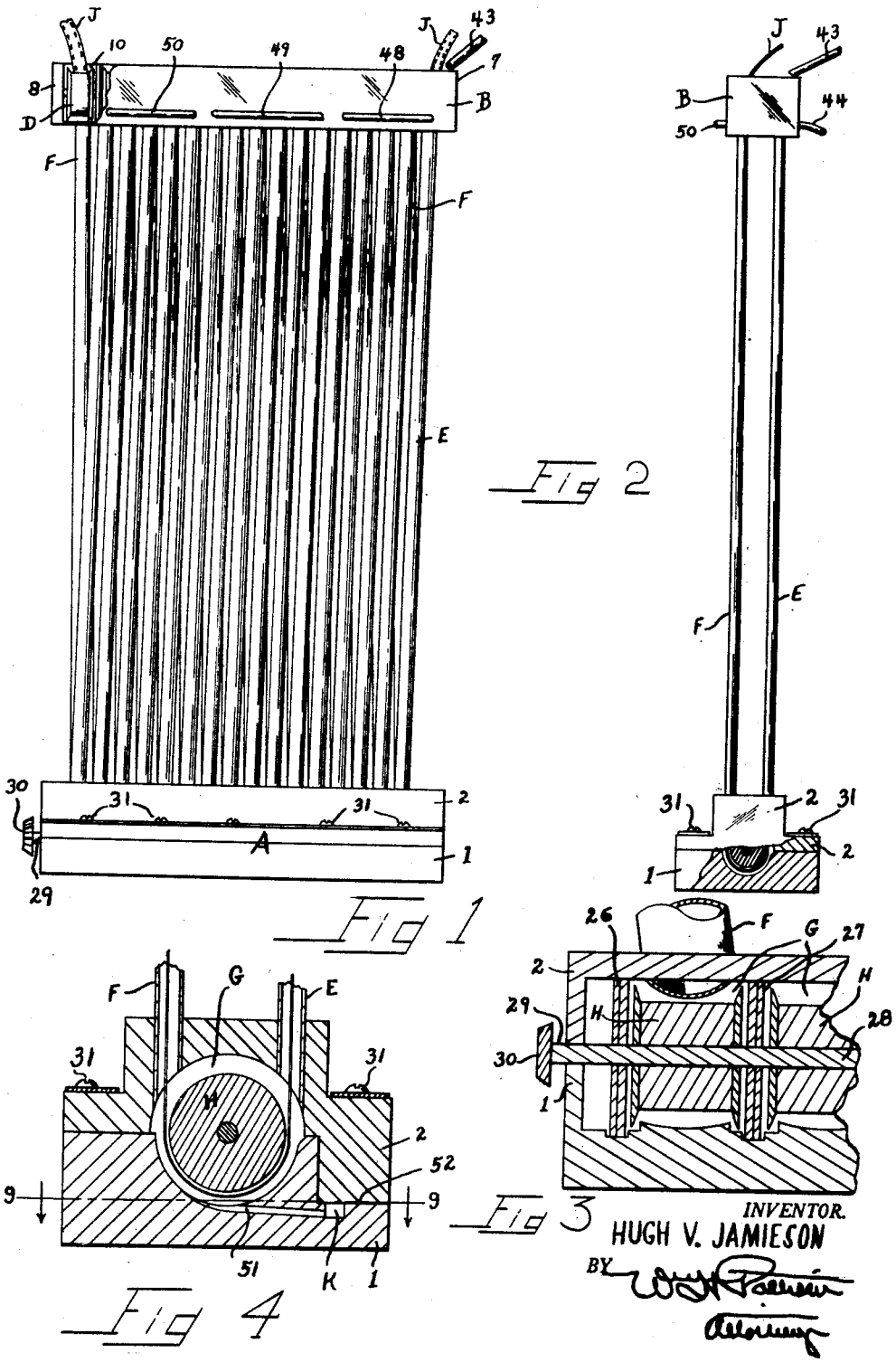

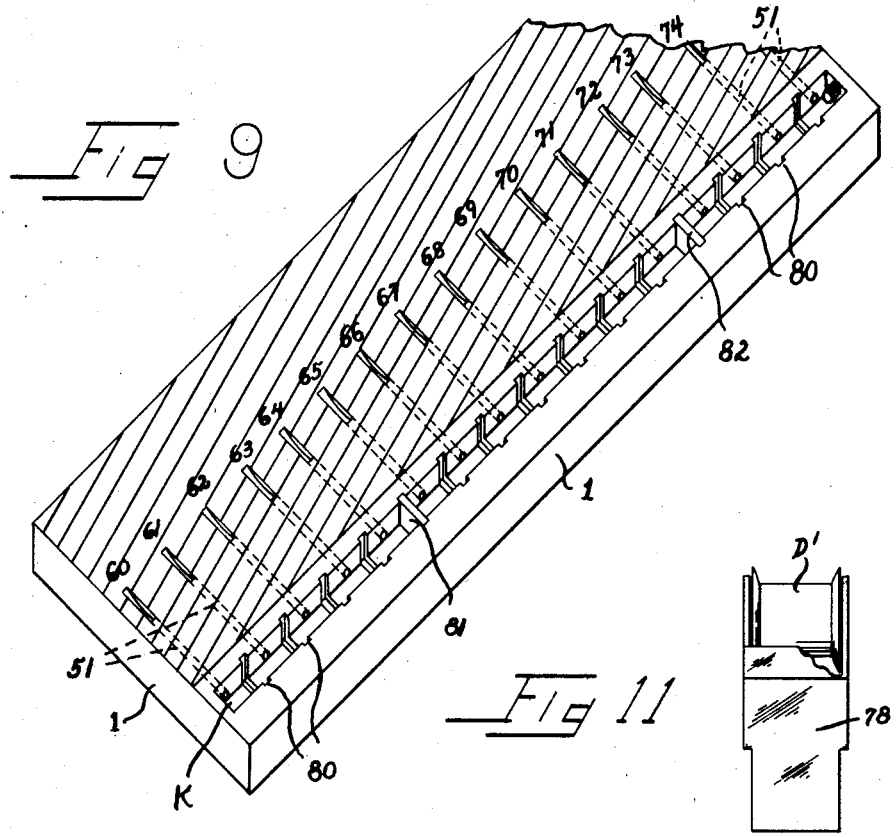
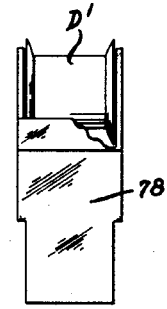
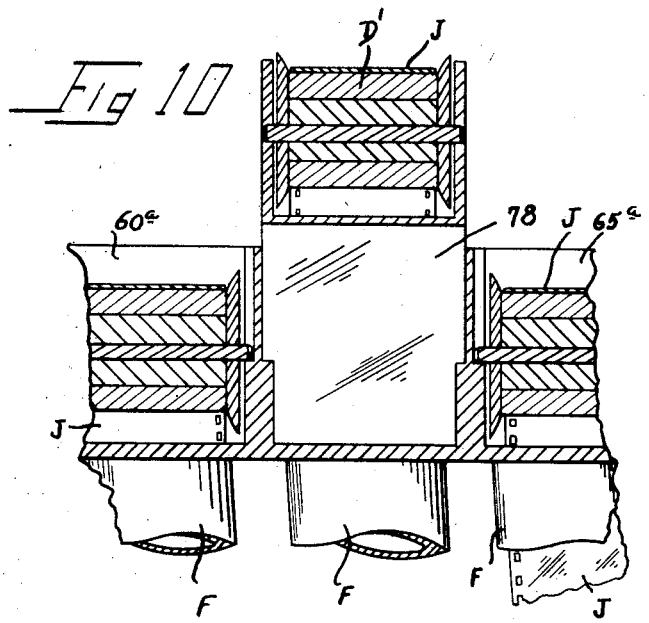
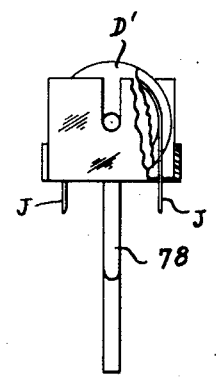
INVENTOR.
HUGH V. JAMIESON

INVENTOR.
HUGH V. JAMIESON

United States Patent Office 2,914,999
Patented Dec. 1, 1959

2,914,999

APPARATUS FOR PROCESSING MOTION PICTURE FILM

Hugh V. Jamieson, Dallas, Tex.

Application October 6, 1955, Serial No. 538,919

6 Claims. (Cl. 95—94)

This invention relates to an apparatus for processing motion picture film and pertains more particularly and specifically to a machine to enable the practice of a method for continuously processing such film.

An object of the invention is the provision of a machine or apparatus through which a film tape or length is continuously moved to perform a series of processing steps such as development, rinse, hypobath, washing and drying.

Another object of the invention is the provision of a novel construction and method of maintaining in the machine the liquid level of the different solutions used in the performance of the different steps.

Another object of the invention is to provide facilities whereby fresh solution can be fed into the machine at any desired point and made to follow any desired direction of overall movement. It is designed so that the rate of input of solution shall equal the rate at which it is considered to be used up in the process it is used for, and that the solution will be exhausted to the desired extent when it overflows to waste. The advantage of this is that after a short period after initiation of a new set up, the solution throughout all the tubes will quickly reach a balance which will be maintained over an unlimited amount of continuous processing. This is so because the total amount of solution in use at one time is so small that the rate of addition of new solution keeps it moving so that the effects of exhaustion and reaction products are confined to a small part of the total processing time and are by the same means kept relatively constant. Thus the solution is used to the desired extent and discarded without recirculation and without the necessity of adding boosters designed to keep the various reagents in a solution in the proper balance, which is necessary where large quantities of developer are used.

Another object of the invention is the provision of a novel arrangement for threading and rethreading the film tape through the machine.

The apparatus and method is particularly advantageous in the processing of natural color film which requires immersion in the processing solution for much longer periods of time than is the case in respect to black and white photographic film.

A still further advantage of the method and apparatus resides in the fact that the processing of film may be efficiently accomplished with a far lesser amount of processing solution in use at a time than has been required heretofore in the accomplishment of the same result and accordingly it is economically feasible to more frequently change or replace the processing fluid or liquid due to the lesser quantity involved.

In the drawings:

Fig. 1 is a view in side elevation of a machine embodying the inventive concepts and with which the method can be practiced, a portion of the view at the top being broken away for the purposes of better illustration.

Fig. 2 is a view in end elevation of the machine, a portion of the view being broken away and shown in vertical section.

Fig. 3 is a detail view in vertical section through the base of the machine.

Fig. 4 is a vertical sectional view through a modified form of base for the machine.

Fig. 5 is a fragmentary top view of the machine appearing in Fig. 1.

Fig. 6 is a schematic view illustrating the flow control of the processing fluid or liquid for the machine of Fig. 1.

Fig. 7 is a schematic view of the control for the flow of the processing fluid or liquid with the base of Fig. 4.

Fig. 8 is a longitudinal horizontal sectional view through the base illustrated in Fig. 4.

Fig. 9 is a longitudinal perspective horizontal sectional view on the line 4—4 of Fig. 4.

Fig. 10 is an enlarged detail view in vertical section illustrating the use of a roller carrying divider in a cell at the top of the machine.

Fig. 11 is a view in side elevation of the divider appearing in Fig. 10, the figure being partially broken away and appearing in vertical section to better illustrate the construction.

Fig. 12 is a view in side elevation of the divider, a portion of the view being broken away and shown in vertical section.

Figure 13:
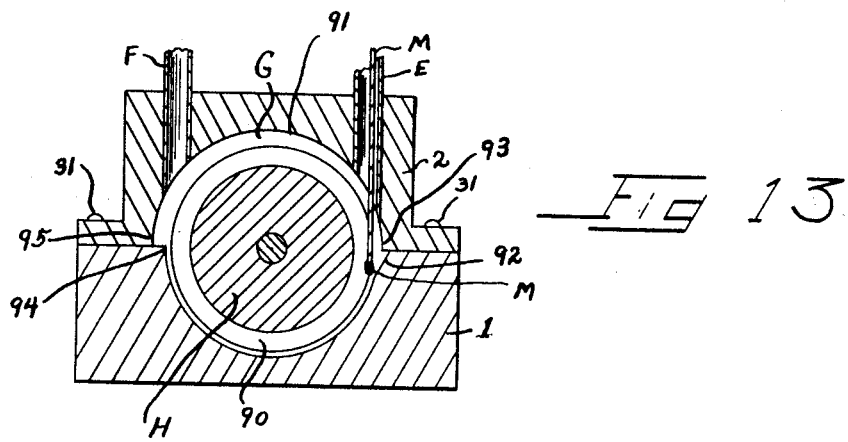
Figs. 13, 14 and 15 are vertical sectional views through the base and illustrate the several stages of threading film through the machine.

In the practice of the invention a plurality of what I term units are employed. The number of units utilized would depend upon the particular film processing which is being undertaken. The size of each unit is also variable in accordance with the particular processing being practiced. A unit as an entirety is illustrated in Figs. 1, 2, and 3 of the drawings.

Referring to these three figures of the drawings, A is a base made up of separable bottom and top elements 1 and 2. B is the head of the unit and is a rectangular shaped box-like member provided throughout its length with a plurality of transversely extending partitions, such as 3,4, 5 and 6, see Fig. 5, which divide the head or box into a plurality of cells of similar size and configuration. To simplify an understanding of the following description the head cells are numbered 10 to 25 inclusive. A roller D which is disposed in each cell, see Fig. 5, has been omitted for better illustration in respect to cell 22.

A plurality of vertically disposed tubes interconnect the base and the head. The tubes E at one side of the unit extend at an inclination to the vertical while tubes F at the other side of the unit, these tubes are behind the tubes E, extend at an inclination to the vertical but their inclination is opposite to that of the tubes E. As will hereinafter appear these tubes form a continuous spiral-like passageway through the unit and the film tape travels through this passageway.

Because the film travels downwardly in the tubes E they will be referred to as "down" tubes and because the film travels upwardly in tubes F they will be referred to as "up" tubes.

Within the base there is a continuous bore throughout the length thereof and this bore has a plurality of transversely extending partitions, such as 26 and 27, to divide the bore into a plurality of chambers, such as the chamber G, see Fig. 3. The number of chambers is one less than the number of cells in the head. A shaft 28 extends throughout the length of the base bore and outwardly beyond one end of the base at 29 and carries a gear 30 which is suitably driven by some power means, not shown. A roller H is disposed in each chamber and is rotatable with the drive shaft 28. The upper end of a down tube communicates with a head cell and its lower end communicates with a base chamber. The complementary up tube extends from the base chamber and has its upper end in communication with the head cell next adjacent to the head cell from which the referred to down tube extends. This arrangement of tubes extending between the head cells and the base chambers is repeated throughout the length of the unit starting with the feed end 7 of the unit and terminating with the exit end 8 of the unit. In Fig. 1 film tape J is shown as entering the tube E from cell 25 at the feed end of the unit and passing out of the unit through tube F and over the roller D in cell 10 at the exit end of the unit.

The unit made up of the head and base and the interconnecting tubes might well be designated a tank inasmuch as all of these elements are hollow and therefore form a general receptacle for a liquid. As a matter of fact this tank is filled with a liquid and the nature of the liquid in a particular unit depends upon the particular treatment the film is to receive in the unit, that is, whether the film is to be developed, rinsed, washed or given a hypobath.

Describing one complete processing operation, such as developing a positive film in the unit, the unit is filled with the proper developing solution which fills completely the tubes and the chambers in the base. The film strip is fed over the roller D in the head cell 25 at the feed end 7 of the unit and travels down the tube E around the roller H in the base chamber G and up tube F into the next head cell and over the roller therein and down through the next tube E and so on through the unit until it leaves the unit over the last roller in cell 10 at the exit end 8 of the unit. The film tape is caused to travel in this manner by the rotation of the driven rollers H in the chambers in the base of the unit.

Use of the unit or apparatus thus far described would have a distinct drawback because there is no provision for counteracting the pumping action imparted to the developer solution caused by the movement of the film tape through the unit. The pumping action of the developer solution is brought about by the friction between the film and the liquid. Viewing the unit in Fig. 1, the film tape travels from right to left and due to the referred to friction between the film and the developer solution the liquid level of the solution will rise in each successive tube and head cell with the result that the solution in the last tube, that is the tube F at the exit end of the unit, will be several inches higher than the level of the solution in the first tube, that is, the tube E leading from the first cell at the feed end 7 of the unit. Actually on a unit comprising the number of tubes illustrated in the drawings the level in the output tube F at the exit end of the unit could be anywhere from 3 to 6 inches higher than in the input tube E at the feed end of the unit. Were it attempted to keep the solution level at the input tube sufficiently high to keep the film immersed by the addition of more solution the carry-over and overflow at the output tube would be so great that the consumption of developer solution would be several times greater than the amount of solution necessary for the processing operation. It is important to limit the consumption of solution to the minimum and the unit is designed to process the film tape with the smallest possible amount of solution.

For the purpose of maintaining the level of the solution in the unit and counteracting the pumping action a solution recirculation means is incorporated into the unit and will now be described.

In processing to develop positive film the developer solution is fed from a suitable source, not shown, through a supply pipe 43 to the first head cell 25 at the feed end 7 of the unit. The remotest head cell, that is the cell 10 at the exit end of the unit, is provided with a solution overflow pipe 44.

It will be obvious that due to the pumping action the solution level will tend to rise progressively in the tubes in a direction toward the exit end of the unit. A return pipe 48 interconnects cells 21 and 25 and carries back to cell 21 the excess solution which has been carried to it by the pumping action. A return pipe 49 interconnects the cells 15 and 20 and operates to return to cell 20 the excess solution which has been pumped to cell 15. A third return pipe 50 interconnects cells 10 and 14 and operates to return to cell 14 the solution which has been pumped to cell 10. Thus it will be seen that these return pipes operate to level off the solution to thereby maintain substantially a constant level of the solution in the tubes and operate to prevent any substantial overflow of solution through the overflow pipe 44 of cell 10. In the absence of this arrangemnt great quantities of solution would be pumped into cell 10 and pass outwardly through the overflow pipe 44 thereof.

The two parts comprising the base are detachably secured together by a series of screws or bolts 31 arranged in spaced relationship along the base top element 2. The base is made separable for two reasons. First, small particles of film might be broken from the film tape and these could, and sometimes do, lodge in the bottoms of the base chambers G. While such occurrences are a rarity it is absolutely essential to remove these particles and this can be quickly done by loosening the screws 31 and removing or dropping the bottom base element 1. Secondly, in another form of the invention, hereinafter specifically described, the construction of the bottom base element is modified and access to the interior of this element is necessary to adapt a unit for different processing operations.

The developer solution level control described is satisfactory where the introduction of fresh solution is at the point where the film enters the unit as is the case in the development of positive film but would not be satisfactory where the introduction of fresh solution is at a point near to the exit of the film from the unit as is necessary in developing negative film. A modified form of base which makes a unit adaptable for use in developing both positive and negative film will now be described.

The modification now to be described provides a unit suitable for developing positive film and in this form of the invention the pipes 48, 49 and 50 are eliminated and the maintenance of the level of the developing solution within the unit is attained by a construction embodied in the bottom base element 1 of the unit.

An understanding of this arrangement can be had by reference to Figs. 4 and 8 of the drawings. Referring first to Fig. 4, the bottom base element 1 is provided in its upper face and at one of its sides with an open conduit K which extends throughout the length of the element but stops short of its end so that the ends of the conduit are closed. This conduit extends alongside of but in spaced relationship to the bottoms of the chambers G and is connected to the bottom of each of these chambers by a bore 51. The open top of the conduit is closed by the bottom face 52 of the upper base element 2. This arrangement places all of the base chambers in communication with one another through the channelway K with the result that as the developer solution is pumped toward the exit end of the unit by the travel of the film, as has been explained, the pumped fluid will not build up to a higher level toward the exit end of the unit because it can return toward and to the feed end of the unit through the channelway K.

From the foregoing it will be seen that the channelway K through its connection with each of the base chambers which of course are in turn in communication with all of the film carrying tubes, functions to maintain the level of the developer solution in much the same manner that that is accomplished by the return pipes 48, 49 and 50 hereinbefore described.

In the development of negative film the process calls for the introduction of fresh developer solution at or near the end of the development process and that would mean the introduction of the solution at or near the point where the film leaves the unit. The base construction immediately before described and illustrated in Fig. 4 of the drawings lends itself to easy and rapid modification to convert the unit to the development of negative film.

By reference to Fig. 9 the conduit K is readily identified as are the bores 51 which form a fluid communication between the channelway and the bottoms of each of the base chambers. In this figure at the point where these bores 51 enter the chambers in their bottoms the numerals 60 to 74 inclusive are utilized to designate the respective base chambers. The channel K between each adjacent bore 51 is provided in its side wall and bottom with a channelway 80 for removably receiving a dam plate such as that indicated at 81. The second dam plate is designated 82. Obviously these dam plates can be positioned at any point desired and their purpose is to isolate the base chambers at one side of the dam from the base chambers at the other side of the dam so far as liquid communication between them is concerned through the medium of the channelway K.

Fig. 7 is a schematic view showing the cells in the unit head and these cells are given the designation 60a to 75a inclusive so as to connect them up with their respective and associated base chambers. In this arrangement the developing solution is fed from a suitable source to cell 63a by a pipe 76 and cell 71a is provided with an overflow pipe 77. In cell 64a a divider plate 78 is inserted and is disposed between the upper ends of the tubes E and F. Referring to Fig. 5 and particularly cell 22 thereof will make it understandable that this division plate is in the space between the tubes E and F and cuts off communication between them. Obviously the roller D normally in this cell has been removed and in its place a roller D' is suitably rotatably mounted in the upper end of the division plate. The film travels over the roller D' just as it would have traveled over the roller D the place of which is taken by the roller D'. This division plate divides cell 64a in half and the second half of the cell is designated 64b.

Referring to the cells as was done in respect to the first described form of the invention as it is illustrated in Fig. 7, compartment A in this instance comprises cells 60a to 64a inclusive; compartment B comprises cells 64b to cell 70a inclusive, and compartment C comprises cells 71a to 75a inclusive. A return flow pipe 83 connects cell 60a of compartment A with cell 70a of compartment B and a return flow pipe 84 connects cell 64b of compartment B with cell 75a of compartment C.

The fresh developer solution is introduced into cell 63a through pipe 76 which is at a point near the end of the developing process. Due to the pumping action this fluid is carried toward cell 60a and the level of the fluid is maintained by connecting this cell with cell 70a of compartment B. Due to the pumping action the solution in compartment B moves toward cell 64b where there would be a build-up and an increase or heightening of the level of the solution were it not for the fact that the return pipe 84 connects cell 64b with cell 75a. Thus it will be seen that the fresh developer solution travels with the film through compartment A and is then carried back to the remote end of the compartment B at cell 70a where from which it travels with the film through that compartment to cell 64b from which it is conveyed to the feed end of the unit into cell 75a from which it travels through compartment C to cell 71a to overflow through pipe 77.

By this arrangement fresh developer solution is delivered to the film at the point where it is nearly completely developed and the undeveloped film enters, cell 75a, where the process solution has become partly exhausted. Should it be desired the manner of using the solution could be even more closely controlled by grouping the cells into a greater number of compartments than the three described. This could be accomplished quite simply by inserting a divider plate 78 in a cell nearer to the exit end of the unit and providing more return pipes in accordance with the number of compartments decided upon. The arrangement makes it possible to introduce the fresh developer solution into the unit closely adjacent the exit end thereof without having the developer carried to overflow almost immediately as would be the case in respect to the first form of the invention where the overflow pipe 44 is from the cell immediately at the exit end of the unit.

In accordance with the compartment arrangement just described it is necessary to place the dams in the conduit K in agreement. As compartment A comprises the last five head cells the dam 81 is accordingly placed just ahead of the fifth base chamber counting from the exit end of the unit The second dam 82 is placed behind the fifth base chamber from the feed end of the unit to agree with the grouping of the first five head cells to form compartment C.

From the description thus far given it will be seen that the apparatus is extremely flexible so as to make it capable of performing numerous processing steps of film in addition to the development of film. A single unit can be broken up into as many compartments as desired and the tubes and chambers making up each compartment can be isolated from the tubes and chambers of adjacent compartments so that different types of fluid can be utilized in different compartments. This would make it possible to make one compartment of the unit function as a hypobath; another compartment as a rinse, and still another compartment as a wash for the film. Accordingly a single unit could treat the film in several different ways.

The apparatus is also suitable for processing color film where different steps requiring different solutions require different times of emersion. The time of emersion can be closely controlled by breaking a unit up so as to contain as many or as few tubes and chambers as may be desired in a compartment.

The apparatus is designed to permit film processing with but a fractional amount of processing solution in use at any given time as is ordinarily required for the same work as apparatus now known and in use. A reduction in the amount of processing solution is made possible by the arrangement that the strands or tapes of film passing over and under rollers rotate on horizontal axes and through tubes that require only a small amount of solution yet sufficient to completely surround the film and allow free movement of the film through the tubes. The base chambers are comparatively small and do not hold large quantities of solution. It is not claimed that the present apparatus and method would consume less solution per foot of film processed. The advantage is that the quantity in use is so small that it can be used and replaced at comparatively small expense as against the expense of replacing large quantities of solution in apparatus, as heretofore known and used. In prior apparatus the large quantity of solution has to be kept for a proportionately longer time before it is completely used up and this naturally results in a deterioration of the solution due to sludge precipitation and oxidation and other deteriorations. Obviously with the small quantity of solution used by the present apparatus it can be more quickly and frequently changed, that is replaced, than is practical or actually possible where large quantities of solution is in use, as is the case with prior apparatus.

Although the present units are very flexible, as has been pointed out, in general practice a plurality of units would be employed in the performance of one complete processing operation. When several units are employed they would all be similar to the one thus far described. One entire unit, such as the first unit, might be employed for development, another unit for rinsing, another unit might be the fixing bath for the film, and still another unit might be a final wash water bath. With the flexibility possible in a single unit, as has been described, a unit could be made sufficiently long and broken up into individual compartments to carry on a complete processing operation but for space reasons it might be more practical to utilize a plurality of units that could be positioned in side by side relationship.

An apparatus such as described would not be acceptable and practical if an adequate means were not provided for threading the film tape through the unit. The present unit is designed so that it may be quickly and readily threaded. There is not only the problem of threading the unit but also the matter of taking care of breaks in the film should they occur. Although such occurrences are not frequent, rethreading is necessary when they occur and this rethreading must be accomplishable with the expenditure of a minimum of time and effort.

In the threading of the unit a leader in the form of a steel or plastic tape is secured to the lead end of the film and this is pushed downwardly through the first down tube at the feed end of the unit. The stiffness of this leader must be sufficient to prevent its buckling and it must withstand without buckling the pressure necessary to force it along and around the circular path it must follow in traveling beneath a roller in the bottom of a base chamber. It is highly important, in fact essential, that no rough or protruding surface or abutment be presented to the leader in its travel through the unit. To guard against such a possibility the walls comprising the chambers G in the base are constructed in a particular and specific manner which will now be described.

Figure 14:
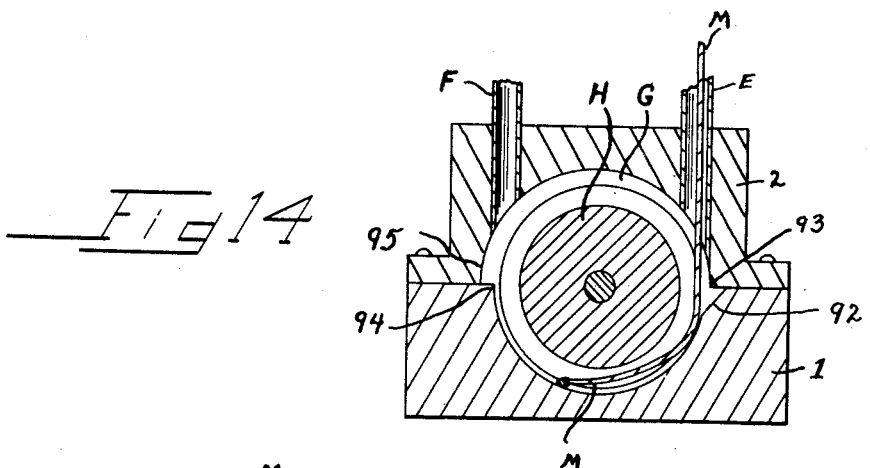
Figure 15:
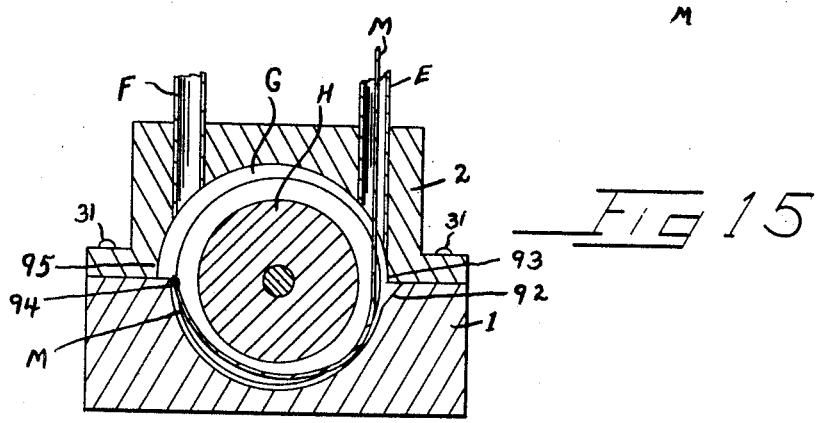

Having reference to Figs. 13 to 15, it will be seen that the lower half 90 of each base chamber is formed within the base lower member 1 and that the upper half 91 of the chamber is formed in the upper base member 2. These base members are secured together, as has been mentioned, by screws or bolts 31. To assure that the joint between the base members will not present any obstruction to the passage of the leader M, the base member 1 is cut back or beveled outwardly as at 92 so that the upper base member overhangs it as at 93. This is at the side of the chamber where the film enters. At the side of the chamber where the film passes outwardly the reverse arrangement is provided. The base member 1 overhangs, as at 94, the adjacent and abutting interior chamber surface 95 of the upper base member 2.

The entry of the leader is illustrated in Fig. 13, illustrating clearly how it safely passes the joint between the two base members. Upon a continuous pressure upon the leader and its following film tape the leader starts around the bottom of the chamber and beneath the roller H therein, as is clearly illustrated in Fig. 14. In Fig. 15 the leader is about to safely pass the joint between the upper and lower base members at the other side of the chamber and it will be apparent that it will be guided into the up tube F of the unit.

The threading of the remaining tubes in the unit follows the pattern just described as each base chamber will be similarly constructed to assure proper unobstructed guidance of the leader under and around the roller which is in the chamber.

Should it be necessary to repair a break in the film tape during the operation of the unit, it is necessary only to thread the leader through the first tube following the film break and fasten the front end of the broken film strand to the back end of the leader and in this manner pull the film tape through the successive tubes and connect it, exteriorly of the unit, to the end of the broken film tape. It can be suitably spliced or otherwise joined. The processing can then be continued.

Departures from the specific construction illustrated and described could be made without departing from the inventive concept which is to be limited only by the scope of the hereinafter following claims.

What I claim is:

1. In an apparatus for processing a film tape as it is moved through a liquid bath in the apparatus and wherein the movement of the film through the apparatus from the feed end to the discharge end of the apparatus creates a pumping action which moves the liquid through the apparatus in the direction of the discharge end of the apparatus and thereby raises the liquid level in the apparatus progressively towards the discharge end of the apparatus, a liquid filled passageway through which the film tape travels and through which the liquid is pumped, and means for counteracting the pumping action of the film and maintaining a substantially constant liquid level in the passageway throughout the length thereof comprising pipes at spaced intervals along the length of the passageway and remote to the feed end thereof taking liquid from the passageway and conveying it in a direction counter to the direction of the film travel and returning the liquid to the passageway at a point nearer to the feed end of the passageway.

2. In an apparatus for processing a film tape as it is moved continuously through the apparatus, a head forming a receptacle, means dividing the head into a plurality of cells disposed in side by side relationship extending from a feed end to a discharge end of the head, a base positioned below and in spaced relationship to the head and having therein a plurality of chambers equalling one less in number than the number of cells in the head, a series of hollow tubes interconnecting the cells and chambers to form a continuous passageway through the apparatus following a path pattern of alternately connecting a cell with a chamber, a film treating liquid filling the tubes and chambers, means to progress a film tape through the passageway, and means for maintaining the level of the film treating liquid in the tubes comprising: a liquid supply communicating with the first cell at the feed end of the apparatus and a pipe interconnecting a pair of remotely positioned head cells for conveying liquid from one of said cells to the other.

3. In an apparatus for processing a film tape as it is moved continuously through the apparatus, a head forming a receptacle, means dividing the head into a plurality of cells disposed in side by side relationship extending from a feed end to a discharge end of the head, a base positioned below and in spaced relationship to the head and having therein a plurality of chambers equalling one less in number than the number of the cells in the head, a series of hollow tubes interconnecting the cells and chambers to form a continuous passageway through the apparatus following a path pattern of alternately connecting a cell with a chamber, a film treating liquid filling the tubes and chambers, means to progress a film tape through the passageway, and means for maintaining the level of the film treating liquid in the tubes comprising: a liquid supply communicating with the first cell at the feed end of the apparatus, a pipe interconnecting the first cell at the feed end of the apparatus with a remotely positioned cell, a second pipe interconnecting the cell at the discharge end of the head with a cell remote thereto in the direction of the feed end of the apparatus, and a third pipe positioned in the space between the first two named pipes and interconnecting a pair of remotely positioned cells located intermediate the length of the head.

4. In an apparatus for processing a film tape as it is moved continuously through the apparatus, a head forming a receptacle, means dividing the head into a plurality of cells disposed in side by side relationship extending from a feed end to a discharge end of the head, a base positioned below and in spaced relationship to the head and having therein a plurality of chambers equalling one less in number than the number of cells in the head, a series of hollow tubes interconnecting the cells and chambers to form a continuous passageway through the apparatus following a path pattern of alternately connecting a cell with a chamber, a film treating liquid filling the tubes and chambers, means to progress a film tape through the passageway, and means for maintaining the level of the film treating liquid in the tubes comprising: a liquid supply communicating with the first cell at the feed end of the apparatus, a conduit extending longitudinally of the base and in spaced relationship to the chambers therein, and a bore extending from each base chamber to and communicating with the conduit, the conduit and bores acting to maintain a substantially constant level of the film treating liquid in the tubes.

5. In an apparatus for processing a film tape as it is moved continuously through the apparatus, a head forming a receptacle, means dividing the head into a plurality of cells disposed in side by side relationship extending from a feed end to a discharge end of the head, a base positioned below and in spaced relationship to the head and having therein a plurality of chambers equalling one less in number than the number of cells in the head, a series of hollow tubes interconnecting the cells and chambers to form a continuous passageway through the apparatus following a path pattern of alternately connecting a cell with a chamber, a film treating liquid filling the tubes and chambers, means to progress a film tape through the passageway, a liquid supply communicating with a head cell which is a few cells remote from the cell at the discharge end of the head, a pipe extending from the cell at the discharge end of the head to a cell which is a few cells remote from the cell at the feed end of the head, a second pipe extending from the cell next adjacent on the feed head side of the cell to which solution is supplied and extending to the first cell at the feed end of the head, a conduit extending longitudinally of the base, a bore interconnecting each base chamber individually with the conduit, a dam positioned in the conduit between the bore to the chamber which is complementary to the cell to which the solution is being supplied, a second dam positioned in the conduit between the chamber which is complementary to the cell with which the pipe running from the discharge cell communicates and the chamber which is next adjacent thereto toward the feed end of the apparatus, a longitudinally extending partition in the cell to which the solution is being supplied and dividing said cell into two parts, and a roller carried by the upper end of the partition.

6. In an apparatus for processing a film tape as it is removed continuously through the apparatus, a head, a base positioned below and in spaced relationship to the head, means dividing the head into a plurality of cells disposed in side by side relationship, the base being provided with a plurality of chambers complementary to the head cells, a series of hollow tubes interconnecting the cells and chambers to form a continuous passageway through the apparatus following a path pattern of alternately connecting a cell with a chamber, a roller in each cell, a roller in each chamber, each chamber being circular in cross sectional configuration, the base being composed of a lower member and an upper member removably secured thereto, half of the tubes being down tubes through which the film travels downwardly and half of the tubes being up tubes through which the film travels upwardly, the lower portion of each base member being in the lower base member and the upper portion of each base chamber being in the upper base member, the chamber wall of the lower base member at that side beneath the down tube being offset outwardly at its point of joinder with the adjacent chamber wall in the upper base member, and the chamber wall of the lower base member at that side beneath the up tube and its point of joinder with the adjacent chamber wall of the upper base member being offset inwardly, whereby a film tape leader can traverse the chamber around and beneath the roller therein without danger of encountering an obstruction at the point of joinder of the upper and lower base members to one another.

References Cited in the file of this patent

UNITED STATES PATENTS

| | | |
|---|---|---|
| 1,410,308 | Holt | Mar. 21, 1922 |
| 1,570,809 | Wescott | Jan. 26, 1926 |
| 2,047,694 | Litz | July 14, 1936 |
| 2,085,188 | Gerlach | June 29, 1937 |
| 2,191,850 | Debrie | Feb. 27, 1940 |
| 2,451,816 | Dunn | Oct. 19, 1948 |
| 2,488,141 | Pratt et al. | Nov. 15, 1949 |
| 2,517,632 | Coote et al. | Aug. 8, 1950 |
| 2,579,407 | Turner | Dec. 18, 1951 |
| 2,688,125 | Mills | Aug. 31, 1954 |
| 2,689,729 | Debrie | Sept. 21, 1954 |
| 2,764,010 | Williams | Sept. 25, 1956 |